US011150664B2

(12) United States Patent
Elluswamy et al.

(10) Patent No.: US 11,150,664 B2
(45) Date of Patent: Oct. 19, 2021

(54) PREDICTING THREE-DIMENSIONAL FEATURES FOR AUTONOMOUS DRIVING

(71) Applicant: Tesla, Inc., Palo Alto, CA (US)

(72) Inventors: Ashok Kumar Elluswamy, Sunnyvale, CA (US); Matthew Bauch, San Francisco, CA (US); Christopher Payne, San Francisco, CA (US); Andrej Karpathy, San Francisco, CA (US); Dhaval Shroff, San Francisco, CA (US); Arvind Ramanandan, Sunnyvale, CA (US); James Robert Howard Hakewill, Los Gatos, CA (US)

(73) Assignee: Tesla, Inc., Palo Alto, CA (US)

( * ) Notice: Subject to any disclaimer, the term of this patent is extended or adjusted under 35 U.S.C. 154(b) by 335 days.

(21) Appl. No.: 16/265,720

(22) Filed: Feb. 1, 2019

(65) Prior Publication Data
US 2020/0249685 A1 Aug. 6, 2020

(51) Int. Cl.
*G05D 1/02* (2020.01)
*G06N 20/00* (2019.01)
(Continued)

(52) U.S. Cl.
CPC ......... *G05D 1/0221* (2013.01); *G05D 1/0214* (2013.01); *G05D 1/0223* (2013.01); *G05D 1/0231* (2013.01); *G06K 9/00798* (2013.01); *G06K 9/6256* (2013.01); *G06N 20/00* (2019.01); *G06T 7/20* (2013.01); *G05D 2201/0213* (2013.01); *G06K 2209/27* (2013.01); *G06T 2207/20076* (2013.01); *G06T 2207/20081* (2013.01); *G06T 2207/20084* (2013.01); *G06T 2207/30241* (2013.01); *G06T 2207/30256* (2013.01)

(58) Field of Classification Search
None
See application file for complete search history.

(56) References Cited

U.S. PATENT DOCUMENTS 10,345,822 B1 * 7/2019 Parchami ............. G05D 1/0088
10,997,461 B2    5/2021 Elluswamy et al.
(Continued)

FOREIGN PATENT DOCUMENTS

WO    WO 18/175441    9/2018

OTHER PUBLICATIONS

Noa Garnett et al: "3D-LaneNet: end-to-end 3D multiple lane detection", arxiv.org, Cornell University Library, 201 Olin Library Cornell University Ithaca, NY 14853, Nov. 27, 2018 (Nov. 27, 2018), XP081041147 (Year: 2018).*
(Continued)

*Primary Examiner* — Jonathan M Dager
*Assistant Examiner* — Garrett F Evans
(74) *Attorney, Agent, or Firm* — Knobbe, Martens, Olson & Bear, LLP

(57) ABSTRACT

A processor coupled to memory is configured to receive image data based on an image captured by a camera of a vehicle. The image data is used as a basis of an input to a trained machine learning model trained to predict a three-dimensional trajectory of a machine learning feature. The three-dimensional trajectory of the machine learning feature is provided for automatically controlling the vehicle.

19 Claims, 6 Drawing Sheets

(51) Int. Cl.
*G06K 9/00* (2006.01)
*G06K 9/62* (2006.01)
*G06T 7/20* (2017.01)

(56) References Cited

U.S. PATENT DOCUMENTS

2015/0321699 A1* 11/2015 Rebhan .............. B62D 15/0255
    701/23
2018/0023960 A1   1/2018 Fridman
2018/0373263 A1  12/2018 Gray
2019/0310651 A1  10/2019 Vallespi-Gonzalez

OTHER PUBLICATIONS

Garnett et al., Nov. 27, 2018, 3D-lanenet: end-to-end 3D multiple lane detection, Cornell University, 9 pp.
International Search Report and Written Opinion dated May 8, 2020 in PCT/US2020/015383.

* cited by examiner

PREDICTING THREE-DIMENSIONAL FEATURES FOR AUTONOMOUS DRIVING

BACKGROUND OF THE INVENTION

Deep learning systems used for applications such as autonomous driving are developed by training a machine learning model. Typically, the performance of the deep learning system is limited at least in part by the quality of the training set used to train the model. In many instances, significant resources are invested in collecting, curating, and annotating the training data. Traditionally, much of the effort to curate a training data set is done manually by reviewing potential training data and properly labeling the features associated with the data. The effort required to create a training set with accurate labels can be significant and is often tedious. Moreover, it is often difficult to collect and accurately label data that a machine learning model needs improvement on. Therefore, there exists a need to improve the process for generating training data with accurate labeled features.

BRIEF DESCRIPTION OF THE DRAWINGS

Various embodiments of the invention are disclosed in the following detailed description and the accompanying drawings.

DETAILED DESCRIPTION

Figure 1:
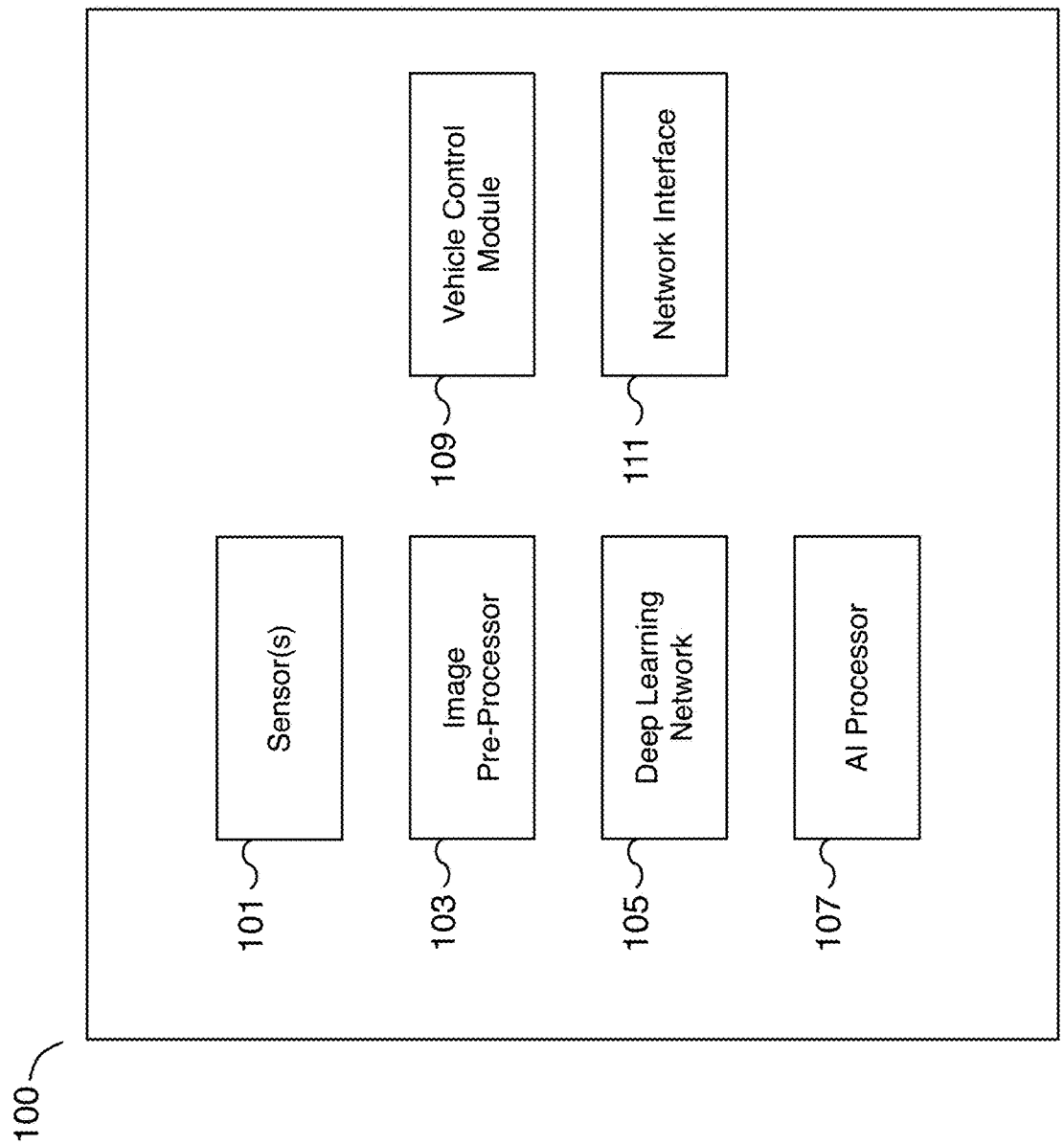
FIG. 1 is a block diagram illustrating an embodiment of a deep learning system for autonomous driving.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A machine learning training technique for generating highly accurate machine learning results is disclosed. Using data captured by sensors on a vehicle to capture the environment of the vehicle and vehicle operating parameters, a training data set is created. For example, sensors affixed to a vehicle capture data such as image data of the road and the surrounding environment a vehicle is driving on. The sensor data may capture vehicle lane lines, vehicle lanes, other vehicle traffic, obstacles, traffic control signs, etc. Odometry and other similar sensors capture vehicle operating parameters such as vehicle speed, steering, orientation, change in direction, change in location, change in elevation, change in speed, etc. The captured data sets are transmitted to a training server for creating a training data set. The training data set is used to train a machine learning model for generating highly accurate machine learning results. In some embodiments, a time series of captured data is used to generate the training data. For example, a ground truth is determined based on a group of time series elements and is associated with a single element from the group. As one example, a series of images for a time period, such as 30 seconds, is used to determine the actual path of a vehicle lane line over the time period the vehicle travels. The vehicle lane line is determined by using the most accurate images of the vehicle lane over the time period. Different portions (or locations) of the lane line may be identified from different image data of the time series. As the vehicle travels in a lane alongside a lane line, more accurate data is captured for different portions of the lane line. In some examples, occluded portions of the lane line are revealed as the vehicle travels, for example, along a hidden curve or over a crest of a hill. The most accurate portions of the lane line from each image of the time series may be used to identify a lane line over the entire group of image data. Image data of the lane line in the distance is typically less detailed than image data of the lane line near the vehicle. By capturing a time series of image data as a vehicle travels along a lane, accurate image data and corresponding odometry data for all portions of the corresponding lane line are collected.

In some embodiments, a three-dimensional representation of a feature, such as a lane line, is created from the group of time series elements that corresponds to the ground truth. This ground truth is then associated with a subset of the time series elements, such as a single image frame of the group of captured image data. For example, the first image of a group of images is associated with the ground truth for a lane line represented in three-dimensional space. Although the ground truth is determined based on the group of images, the selected first frame and the ground truth are used to create a training data. As an example, training data is created for predicting a three-dimensional representation of a vehicle lane using only a single image. In some embodiments, any element or a group of elements of a group of time series elements is associated with the ground truth and used to create training data. For example, the ground truth may be applied to an entire video sequence for creating training data. As another example, an intermediate element or the last element of a group of time series elements is associated with the ground truth and used to create training data.

In various embodiments, the selected image and ground truth may apply to different features such as lane lines, path prediction for vehicles including neighboring vehicles, depth distances of objects, traffic control signs, etc. For example, a series of images of a vehicle in an adjacent lane is used to predict that vehicle's path. Using the time series of images and the actual path taken by the adjacent vehicle, a single image of the group and the actual path taken can be used as training data to predict the path of the vehicle. The information can also be used to predict whether an adjacent vehicle will cut into the path of the autonomous vehicle. For example, the path prediction can predict whether an adjacent vehicle will merge in front of an autonomous vehicle. The autonomous vehicle can be controlled to minimize the likelihood of a collision. For example, the autonomous vehicle can slow down to prevent a collision, adjust the speed and/or steering of the vehicle to prevent a collision, initiate a warning to the adjacent vehicle and/or occupants of the autonomous vehicle, and/or change lanes, etc. In various embodiments, the ability to accurately infer path predictions including vehicle path predictions significantly improves the safety of the autonomous vehicle.

In some embodiments, the trained machine learning model is used to predict a three-dimensional representation of one or more features for autonomous driving including lane lines. For example, instead of identifying a lane line in two-dimensions from image data by segmenting an image of a lane line, a three-dimensional representation is generated using the time series of elements and odometry data corresponding to the time series. The three-dimensional representation includes changes in elevation that greatly improve the accuracy of lane line detection and the detection of corresponding lanes and identified drivable paths. In some embodiments, a lane line is represented using one or more splines or another parameterized form of representation. The use of a piecewise polynomial to represent a lane line greatly reduces the computational resources needed to evaluate a three dimensional object. This reduction in computational resources corresponds to an improvement in processing speed and efficiency without significantly sacrificing the accuracy of the representation. In various embodiments, a lane line, including in particular the curves of the lane line, can be represented using a piecewise polynomial, a set of three-dimensional points, or another appropriate representation. For example, the piecewise polynomial interpolates the actual lane line using highly accurate sections of the lane line identified from a group of elements captured over time using sensor data.

In some embodiments, sensor data is received. The sensor data may include an image (such as video and/or still images), radar, audio, lidar, inertia, odometry, location, and/or other forms of sensor data. The sensor data includes a group of time series elements. For example, a group of time series elements may include a group of images captured from a camera sensor of a vehicle over a time period. In some embodiments, a training dataset is determined including by determining for at least a selected time series element in the group of time series elements a corresponding ground truth based on a plurality of time series elements in the group of time series elements. For example, a ground truth is determined by examining the most relevant portions of each element of the group of time series elements including previous and/or subsequent time series elements in the group. In some scenarios, only the previous and/or subsequent time series elements include data that is absent from earlier time series elements, such as a vehicle lane line that initially disappears around a curve and is only revealed in later elements of the time series. The determined ground truth may be a three-dimensional representation of a vehicle lane line, a predicted path for a vehicle, or another similar prediction. An element of the group of time series elements is selected and associated with the ground truth. The selected element and the ground truth are part of the training dataset. In some embodiments, a processor is used to train a machine learning model using the training dataset. For example, the training dataset is used to train a machine learning model for inferring features used for self-driving or driver-assisted operation of a vehicle. Using the trained machine learning model, a neural network can infer features associated with autonomous driving such as vehicle lanes, drivable space, objects (e.g., pedestrians, stationary vehicles, moving vehicles, etc.), weather (e.g., rain, hail, fog, etc.), traffic control objects (e.g., traffic lights, traffic signs, street signs, etc.), traffic patterns, etc.

In some embodiments, a system comprises a processor and memory coupled to the processor. The processor is configured to receive image data based on an image captured by a camera of a vehicle. For example, a camera sensor affixed to a vehicle captures an image of the vehicle's environment. The camera may be a forward facing camera, a pillar camera, or another appropriately positioned camera. Image data captured from the camera is processed using a processor, such as a GPU or AI processor, on the vehicle. In some embodiments, the image data is used as a basis of an input to a trained machine learning model trained to predict a three-dimensional trajectory of a vehicle lane. For example, the image data is used as an input to a neural network trained to predict vehicle lanes. The machine learning model infers a three-dimensional trajectory for a detected lane. Instead of segmenting the image into lanes and non-lane segments of a two-dimensional image, a three-dimensional representation is inferred. In some embodiments, the three-dimensional representation is a spline, a parametric curve, or another representation capable of describing curves in three-dimensions. In some embodiments, the three-dimensional trajectory of the vehicle lane is provided in automatically controlling the vehicle. For example, the three-dimensional trajectory is used to determine lane lines and corresponding drivable space.

FIG. 1 is a block diagram illustrating an embodiment of a deep learning system for autonomous driving. The deep learning system includes different components that may be used together for self-driving and/or driver-assisted operation of a vehicle as well as for gathering and processing data for training a machine learning model for autonomous driving. In various embodiments, the deep learning system is installed on a vehicle. Data from the vehicle can be used to train and improve the autonomous driving features of the vehicle or other similar vehicles.

In the example shown, deep learning system 100 is a deep learning network that includes sensors 101, image pre-processor 103, deep learning network 105, artificial intelligence (AI) processor 107, vehicle control module 109, and network interface 111. In various embodiments, the different components are communicatively connected. For example, sensor data from sensors 101 is fed to image pre-processor 103. Processed sensor data of image pre-processor 103 is fed to deep learning network 105 running on AI processor 107. The output of deep learning network 105 running on AI processor 107 is fed to vehicle control module 109. In various embodiments, vehicle control module 109 is connected to and controls the operation of the vehicle such as the speed, braking, and/or steering, etc. of the vehicle. In various embodiments, sensor data and/or machine learning results can be sent to a remote server via network interface 111. For example, sensor data can be transmitted to a remote server via network interface 111 to collect training data for improving the performance, comfort, and/or safety of the vehicle. In various embodiments, network interface 111 is used to communicate with remote servers, to make phone calls, to send and/or receive text messages, and to transmit sensor data based on the operation of the vehicle, among other reasons. In some embodiments, deep learning system 100 may include additional or fewer components as appropriate. For example, in some embodiments, image pre-processor 103 is an optional component. As another example, in some embodiments, a post-processing component (not shown) is used to perform post-processing on the output of deep learning network 105 before the output is provided to vehicle control module 109.

In some embodiments, sensors 101 include one or more sensors. In various embodiments, sensors 101 may be affixed to a vehicle, at different locations of the vehicle, and/or oriented in one or more different directions. For example, sensors 101 may be affixed to the front, sides, rear, and/or roof, etc. of the vehicle in forward-facing, rear-facing, side-facing, etc. directions. In some embodiments, sensors 101 may be image sensors such as high dynamic range cameras. In some embodiments, sensors 101 include non-visual sensors. In some embodiments, sensors 101 include radar, audio, LiDAR, inertia, odometry, location, and/or ultrasonic sensors, among others. In some embodiments, sensors 101 are not mounted to the vehicle with vehicle control module 109. For example, sensors 101 may be mounted on neighboring vehicles and/or affixed to the road or environment and are included as part of a deep learning system for capturing sensor data. In some embodiments, sensors 101 include one or more cameras that capture the road surface the vehicle is traveling on. For example, one or more front-facing and/or pillar cameras capture lane markings of the lane the vehicle is traveling in. As another example, cameras capture neighboring vehicles including those attempting to cut into the lane the vehicle is traveling in. Additional sensors capture odometry, location, and/or vehicle control information including information related to vehicle trajectory. Sensors 101 may include both image sensors capable of capturing still images and/or video. The data may be captured over a period of time, such as a sequence of captured data over a period of time. For example, images of lane markings may be captured along with vehicle odometry data over a period of 15 seconds or another appropriate period. In some embodiments, sensors 101 include location sensors such as global position system (GPS) sensors for determining the vehicle's location and/or change in location.

In some embodiments, image pre-processor 103 is used to pre-process sensor data of sensors 101. For example, image pre-processor 103 may be used to pre-process the sensor data, split sensor data into one or more components, and/or post-process the one or more components. In some embodiments, image pre-processor 103 is a graphics processing unit (GPU), a central processing unit (CPU), an image signal processor, or a specialized image processor. In various embodiments, image pre-processor 103 is a tone-mapper processor to process high dynamic range data. In some embodiments, image pre-processor 103 is implemented as part of artificial intelligence (AI) processor 107. For example, image pre-processor 103 may be a component of AI processor 107. In some embodiments, image pre-processor 103 may be used to normalize an image or to transform an image. For example, an image captured with a fisheye lens may be warped and image pre-processor 103 may be used to transform the image to remove or modify the warping. In some embodiments, noise, distortion, and/or blurriness is removed or reduced during a pre-processing step. In various embodiments, the image is adjusted or normalized to improve the result of machine learning analysis. For example, the white balance of the image is adjusted to account for different lighting operating conditions such as daylight, sunny, cloudy, dusk, sunrise, sunset, and night conditions, among others.

In some embodiments, deep learning network 105 is a deep learning network used for determining vehicle control parameters including analyzing the driving environment to determine lane markers, lanes, drivable space, obstacles, and/or potential vehicle paths, etc. For example, deep learning network 105 may be an artificial neural network such as a convolutional neural network (CNN) that is trained on input such as sensor data and its output is provided to vehicle control module 109. As one example, the output may include at least a three-dimensional representation of lane markers. As another example, the output may include at least potential vehicles that are likely to merge into the vehicle's lane. In some embodiments, deep learning network 105 receives as input at least sensor data. Additional input may include scene data describing the environment around the vehicle and/or vehicle specifications such as operating characteristics of the vehicle. Scene data may include scene tags describing the environment around the vehicle, such as raining, wet roads, snowing, muddy, high density traffic, highway, urban, school zone, etc. In some embodiments, the output of deep learning network 105 is a three-dimensional trajectory of the vehicle lane of the vehicle. In some embodiments, the output of deep learning network 105 is a potential vehicle cut-in. For example, deep learning network 105 identifies a neighboring vehicle that is likely to enter into the lane ahead of the vehicle.

In some embodiments, artificial intelligence (AI) processor 107 is a hardware processor for running deep learning network 105. In some embodiments, AI processor 107 is a specialized AI processor for performing inference using a convolutional neural network (CNN) on sensor data. AI processor 107 may be optimized for the bit depth of the sensor data. In some embodiments, AI processor 107 is optimized for deep learning operations such as neural network operations including convolution, dot-product, vector, and/or matrix operations, among others. In some embodiments, AI processor 107 is implemented using a graphics processing unit (GPU). In various embodiments, AI processor 107 is coupled to memory that is configured to provide the AI processor with instructions which when executed cause the AI processor to perform deep learning analysis on the received input sensor data and to determine a machine learning result used for autonomous driving. In some embodiments, AI processor 107 is used to process sensor data in preparation for making the data available as training data.

In some embodiments, vehicle control module 109 is utilized to process the output of artificial intelligence (AI) processor 107 and to translate the output into a vehicle control operation. In some embodiments, vehicle control module 109 is utilized to control the vehicle for autonomous driving. In various embodiments, vehicle control module 109 can adjust speed, acceleration, steering, braking, etc. of the vehicle. For example, in some embodiments, vehicle control module 109 is used to control the vehicle to maintain the vehicle's position within a lane, to merge the vehicle into another lane, to adjust the vehicle's speed and lane positioning to account for merging vehicles, etc.

In some embodiments, vehicle control module 109 is used to control vehicle lighting such as brake lights, turns signals, headlights, etc. In some embodiments, vehicle control module 109 is used to control vehicle audio conditions such as the vehicle's sound system, playing audio alerts, enabling a microphone, enabling the horn, etc. In some embodiments, vehicle control module 109 is used to control notification systems including warning systems to inform the driver and/or passengers of driving events such as a potential collision or the approach of an intended destination. In some embodiments, vehicle control module 109 is used to adjust sensors such as sensors 101 of a vehicle. For example, vehicle control module 109 may be used to change parameters of one or more sensors such as modifying the orientation, changing the output resolution and/or format type, increasing or decreasing the capture rate, adjusting the captured dynamic range, adjusting the focus of a camera, enabling and/or disabling a sensor, etc. In some embodiments, vehicle control module 109 may be used to change parameters of image pre-processor 103 such as modifying the frequency range of filters, adjusting feature and/or edge detection parameters, adjusting channels and bit depth, etc. In various embodiments, vehicle control module 109 is used to implement self-driving and/or driver-assisted control of a vehicle. In some embodiments, vehicle control module 109 is implemented using a processor coupled with memory. In some embodiments, vehicle control module 109 is implemented using an application-specific integrated circuit (ASIC), a programmable logic device (PLD), or other appropriate processing hardware.

In some embodiments, network interface 111 is a communication interface for sending and/or receiving data including voice data. In various embodiments, a network interface 111 includes a cellular or wireless interface for interfacing with remote servers, to connect and make voice calls, to send and/or receive text messages, to transmit sensor data, to receive updates to the deep learning network including updated machine learning models, to retrieve environmental conditions including weather conditions and forecasts, traffic conditions, etc. For example, network interface 111 may be used to receive an update for the instructions and/or operating parameters for sensors 101, image pre-processor 103, deep learning network 105, AI processor 107, and/or vehicle control module 109. A machine learning model of deep learning network 105 may be updated using network interface 111. As another example, network interface 111 may be used to update firmware of sensors 101 and/or operating parameters of image pre-processor 103 such as image processing parameters. As yet another example, network interface 111 may be used to transmit potential training data to remote servers for training a machine learning model.

Figure 2:
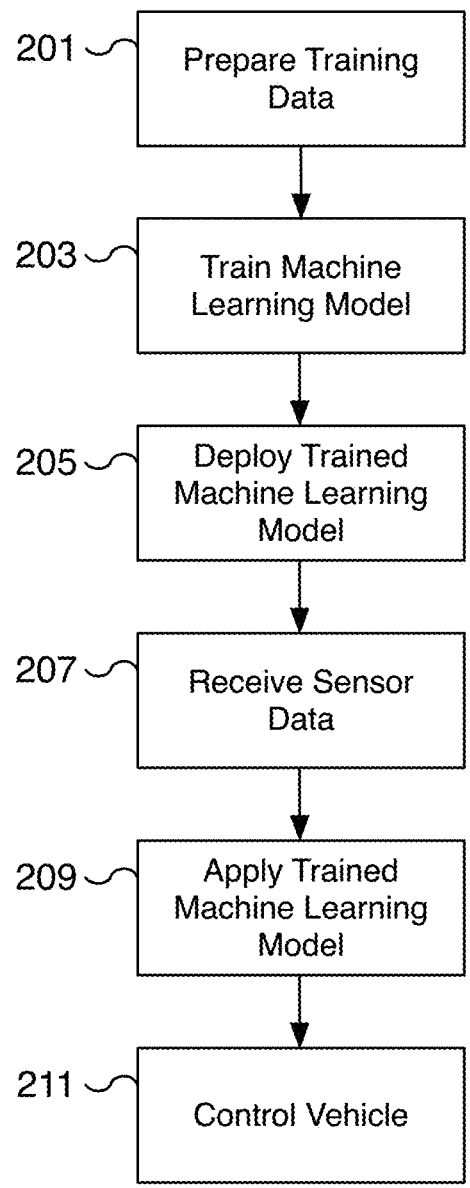
FIG. 2 is a flow diagram illustrating an embodiment of a process for training and applying a machine learning model for autonomous driving.

FIG. 2 is a flow diagram illustrating an embodiment of a process for training and applying a machine learning model for autonomous driving. For example, input data including sensor and odometry data is received and processed to create training data for training a machine learning model. In some embodiments, the sensor data corresponds to image data captured via an autonomous driving system. In some embodiments, the sensor data corresponds to sensor data captured based on particular use cases, such as the user manually disengaging autonomous driving. In some embodiments, the process is used to create and deploy a machine learning model for deep learning system 100 of FIG. 1.

At 201, training data is prepared. In some embodiments, sensor data including image data and odometry data is received to create a training data set. The sensor data may include still images and/or video from one or more cameras. Additional sensors such as radar, lidar, ultrasonic, etc. may be used to provide relevant sensor data. In various embodiments, the sensor data is paired with corresponding odometry data to help identify features of the sensor data. For example, location and change in location data can be used to identify the location of relevant features in the sensor data such as lane lines, traffic control signals, objects, etc. In some embodiments, the sensor data is a time series of elements and is used to determine a ground truth. The ground truth of the group is then associated with a subset of the time series, such as the first frame of image data. The selected element of the time series and the ground truth are used to prepare the training data. In some embodiments, the training data is prepared to train a machine learning model to only identify features from sensor data such as lane lines, vehicle paths, traffic patterns, etc. The prepared training data may include data for training, validation, and testing. In various embodiments, the sensor data may be of different formats. For example, sensor data may be still images, video, audio, etc. The odometry data may include vehicle operation parameters such as applied acceleration, applied braking, applied steering, vehicle location, vehicle orientation, the change in vehicle location, the change in vehicle orientation, etc. In various embodiments, the training data is curated and annotated for creating a training data set. In some embodiments, a portion of the preparation of the training data may be performed by a human curator. In various embodiments, a portion of the training data is generated automatically from data captured from vehicles, greatly reducing the effort and time required to build a robust training data set. In some embodiments, the format of the data is compatible with a machine learning model used on a deployed deep learning application. In various embodiments, the training data includes validation data for testing the accuracy of the trained model.

At 203, a machine learning model is trained. For example, a machine learning model is trained using the data prepared at 201. In some embodiments, the model is a neural network such as a convolutional neural network (CNN). In various embodiments, the model includes multiple intermediate layers. In some embodiments, the neural network may include multiple layers including multiple convolution and pooling layers. In some embodiments, the training model is validated using a validation data set created from the received sensor data. In some embodiments, the machine learning model is trained to predict a three-dimensional representation of a feature from a single input image. For example, a three-dimensional representation of a lane line can be inferred from an image captured from a camera. As another example, the predicted path of a neighboring vehicle including whether the vehicle will attempt to merge is predicted from an image captured from a camera.

At 205, the trained machine learning model is deployed. For example, the trained machine learning model is installed on a vehicle as an update for a deep learning network, such as deep learning network 105 of FIG. 1. In some embodiments, an over-the-air update is used to install the newly trained machine learning model. In some embodiments, the update is a firmware update transmitted using a wireless network such as a WiFi or cellular network. In some embodiments, the new machine learning model may be installed when the vehicle is serviced.

At 207, sensor data is received. For example, sensor data is captured from one or more sensors of the vehicle. In some embodiments, the sensors are sensors 101 of FIG. 1. The sensors may include image sensors such as a fisheye camera mounted behind a windshield, forward or side facing cameras mounted in the pillars, rear-facing cameras, etc. In various embodiments, the sensor data is in the format or is converted into a format that the machine learning model trained at 203 utilizes as input. For example, the sensor data may be raw or processed image data. In some embodiments, the data is data captured from ultrasonic sensors, radar, LiDAR sensors, microphones, or other appropriate technology. In some embodiments, the sensor data is preprocessed using an image pre-processor such as image pre-processor 103 of FIG. 1 during a pre-processing step. For example, the image may be normalized to remove distortion, noise, etc.

At 209, the trained machine learning model is applied. For example, the machine learning model trained at 203 is applied to sensor data received at 207. In some embodiments, the application of the model is performed by an AI processor such as AI processor 107 of FIG. 1 using a deep learning network such as deep learning network 105 of FIG. 1. In various embodiments, by applying the trained machine learning model, three-dimensional representations of features, such as lane lines, are identified and/or predicted. For example, two splines representing the lane lines of the lane the vehicle is traveling in are inferred. As another example, the predicted path of a neighboring vehicle is inferred including whether the neighboring vehicle is likely to cut into the current lane. In various embodiments, vehicles, obstacles, lanes, traffic control signals, map features, object distances, speed limit, drivable space, etc. are identified by applying the machine learning model. In some embodiments, the features are identified in three-dimensions.

At 211, the autonomous vehicle is controlled. For example, one or more autonomous driving features are implemented by controlling various aspects of the vehicle. Examples may include controlling the steering, speed, acceleration, and/or braking of the vehicle, maintaining the vehicle's position in a lane, maintaining the vehicle's position relative to other vehicles and/or obstacles, providing a notification or warning to the occupants, etc. Based on the analysis performed at 209, a vehicle's steering and speed are controlled to maintain the vehicle between two lane lines. For example, left and right lane lines are predicted and a corresponding vehicle lane and drivable space is identified. In various embodiments, a vehicle control module such as vehicle control module 109 of FIG. 1 controls the vehicle.

Figure 3:
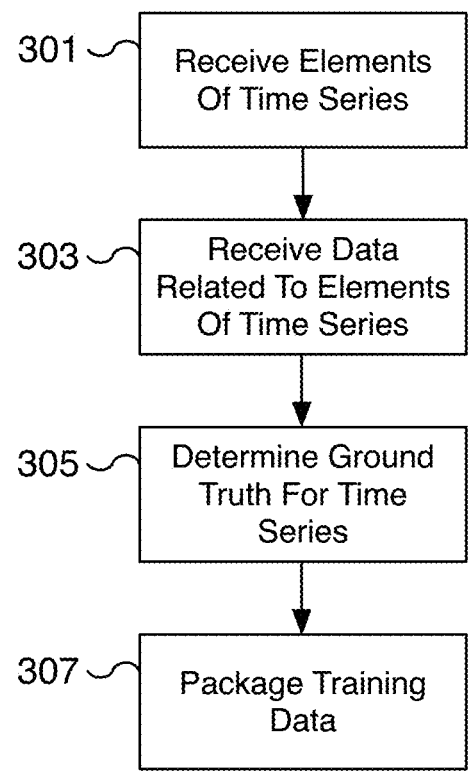
FIG. 3 is a flow diagram illustrating an embodiment of a process for creating training data using a time series of elements.

FIG. 3 is a flow diagram illustrating an embodiment of a process for creating training data using a time series of elements. For example, a time series of elements made up of sensor and odometry data is collected from a vehicle and used to automatically create training data. In various embodiments, the process of FIG. 3 is used to automatically label training data with corresponding ground truths. An outcome corresponding to the time series is associated with an element of the time series. The outcome and selected element are packaged as training data to predict future outcomes. In various embodiments, the sensor and related data are captured using the deep learning system of FIG. 1. For example, in various embodiments, the sensor data is captured from sensor(s) 101 of FIG. 1. In some embodiments, the process of FIG. 3 is performed at 201 of FIG. 2. In some embodiments, the process of FIG. 3 is performed to automatically collect data when existing predictions are incorrect or can be improved. For example, a prediction is made by an autonomous vehicle to determine whether a vehicle is cutting into the path of the autonomous vehicle. After waiting a time period and analyzing captured sensor data, a determination can be made whether the prediction was correct or incorrect. In some embodiments, a determination is made that the prediction can be improved. In the event the prediction was incorrect or could be improved, the process of FIG. 3 can be applied to data related to the prediction to create a curated set of examples for improving the machine learning model.

At 301, elements of a time series are received. In various embodiments, the elements are sensor data such as image data captured at a vehicle and transmitted to a training server. The sensor data is captured over a period of time to create a time series of elements. In various embodiments, the elements are timestamps to maintain an ordering of the elements. As the elements progress through the time series, the events further in the time series are used to help predict an outcome from an earlier element of the time series. For example, a time series may capture a vehicle in an adjacent lane signaling to merge, accelerating, and positioning itself closer to the near lane line. Using the entire time series, the outcome can be used to determine that the vehicle merged into a shared lane. This outcome can be used to predict that a vehicle will merge based on a selected element of the time series, such as one of the early images of the time series. As another example, a time series captures the curve of a lane line. A time series captures the various dips, bends, crests, etc. of a lane that are not apparent from only a single element of the time series. In various embodiments, the elements are sensor data in the format that a machine learning model uses as input. For example, the sensor data may be raw or processed image data. In some embodiments, the data is data captured from ultrasonic sensors, radar, LiDAR sensors, or other appropriate technology.

In various embodiments, the time series is organized by associating a timestamp with each element of the time series. For example, a timestamp is associated with at least the first element in a time series. The timestamp may be used to calibrate time series elements with related data such as odometry data. In various embodiments, the length of the time series may be a fixed length of time, such as 10 seconds, 30 seconds, or another appropriate length. The length of time may be configurable. In various embodiments, the time series may be based on the speed of the vehicle, such as the average speed of the vehicle. For example, at slower speeds, the length of time for a time series may be increased to capture data over a longer distance traveled than would be possible if using a shorter time length for the same speed. In some embodiments, the number of elements in the time series is configurable. For example, the number of elements may be based on the distance traveled. For example, for a fixed time period, a faster moving vehicle includes more elements in the time series than a slower moving vehicle. The additional elements increase the fidelity of the captured environment and can improve the accuracy of the predicted machine learning results. In various embodiments, the number of elements is adjusted by adjusting the frames per second a sensor captures data and/or by discarding unneeded intermediate frames.

At 303, data related to the elements of the time series are received. In various embodiments, the related data is received at a training server along with the elements received at 301. In some embodiments, the related data is odometry data of the vehicle. Using location, orientation, change in location, change in orientation, and/or other related vehicle data, positional data of features identified in the elements of the time series can be labeled. For example, a lane line can be labeled with very accurate position by examining the time series of elements of the lane line. Typically the lane line nearest the vehicle cameras is accurate and closely related to the position of the vehicle. In contrast, the XYZ position of the line furthest away from the vehicle is difficult to determine. The far sections of the lane line may be occluded (e.g., behind a bend or hill) and/or difficult to accurately capture (e.g., due to distance or lighting, etc.). The data related to the elements is used to label portions of features identified in the time series that are identified with a high degree of accuracy. In various embodiments, a threshold value is used to determine whether to associated an identified portion of a feature (such as a portion of a lane line) with the related data. For example, portions of a lane line identified with a high degree of certainty (such as portions near the vehicle) are associated with the related data while portions of a lane line identified with a degree of certainty below a threshold value (such as portions far away from the vehicle) are not associated with the related data of that element. Instead, another element of the time series, such as a subsequent element, with a higher degree of certainty and its related data are used. In some embodiments, the related data is the output of a neural network such as the output of deep learning network 105 of FIG. 1. In some embodiments, the related data is the output of a vehicle control module such as vehicle control module 109 of FIG. 1. The related data may include vehicle operating parameters such as the speed, change in speed, acceleration, change in acceleration, steering, change in steering, braking, change in braking, etc. In some embodiments, the related data is radar data for estimating the distance of objects such as obstacles.

In some embodiments, the data related to the elements of the time series includes map data. For example, offline data such as road and/or satellite level map data is received at 303. The map data may be used to identify features such as roads, vehicle lanes, intersections, speed limits, school zones, etc. For example, the map data can describe the path of vehicle lanes. As another example, the map data can describe the speed limit associated with different roads of the map.

In various embodiments, data related to the elements of the time series are organized by associating a timestamp with the related data. Corresponding timestamps from the time series elements and the related data may be used to synchronize the two data sets. In some embodiments, the data is synchronized at capture time. For example, as each element of a time series is captured, a corresponding set of related data is captured and saved with the time series element. In various embodiments, the time period of the related data is configurable and/or matches the time period of the time series of elements. In some embodiments, the related data is sampled at the same rate as the time series elements.

At 305, a ground truth is determined for the time series. In various embodiments, the time series is analyzed to determine a ground truth associated with a machine learning feature. For example, a lane line is identified from the time series that corresponds to the ground truth for that lane line. As another example, the ground truth for the path of a moving object (such as a vehicle, pedestrian, biker, animal, etc.) is the path identified for a detected moving object from the time series. In some embodiments, in the event the moving vehicle enters into the lane of the autonomous vehicle over the time series, the moving vehicle is annotated as a cut-in vehicle. In some embodiments, the ground truth is represented as a three-dimensional representation such as a three-dimensional trajectory. For example, the ground truth associated with a lane line may be represented as a three-dimensional parameterized spline or curve. As another example, the predicted path for a detected vehicle is determined and represented as a three-dimensional trajectory. The predicted path may be used to determine whether the vehicle is merging into an occupied space. In various embodiments, only by examining the time series of elements can the ground truth be determined. For example, analysis of only a subset of the time series may leave portions of the lane line occluded. By expanding the analysis across a time series of elements, the occluded portions of the lane line are revealed. Moreover, the captured data towards the end of the time series more accurately captures (e.g., with higher fidelity) the details of portions of the lane line further in the distance. Additionally, the related data is also more accurate since the related data is based on data captured closer in proximity (both distance and time). In various embodiments, simultaneous localization and mapping techniques are applied to different portions of a detected object, such as a lane line, identified in different elements of a time series of elements to map different portions of the object to precise three-dimensional locations that include elevation. The set of mapped three-dimensional locations represents the ground truth for the object, such as a segment of a lane line captured over the time series. In some embodiments, the localization and mapping techniques results in a set of precise points, for example, a set of points corresponding to different points along a vehicle lane line. The set of points can be converted to a more efficient format such as a spline or parametric curve. In some embodiments, the ground truth is determined to detect objects such as lane lines, drivable space, traffic controls, vehicles, etc. in three dimensions.

In some embodiments, the ground truth is determined to predict semantic labels. For example, a detected vehicle can be labeled as being in the left lane or right lane. In some embodiments, the detected vehicle can be labeled as being in a blind spot, as a vehicle that should be yielded to, or with another appropriate semantic label. In some embodiments, vehicles are assigned to roads or lanes in a map based on the determined ground truth. As additional examples, the determined ground truth can be used to label traffic lights, lanes, drivable space, or other features that assist autonomous driving.

In some embodiments, the related data is depth (or distance) data of detected objects. By associating the distance data with objects identified in the time series of elements, a machine learning model can be trained to estimate object distances by using the related distance data as the ground truth for detected objects. In some embodiments, the distances are for detected objects such as an obstacle, a barrier, a moving vehicle, a stationary vehicle, traffic control signals, pedestrians, etc.

At 307, the training data is packaged. For example, an element of the time series is selected and associated with the ground truth determined at 305. In various embodiments, the element selected is an early element in the time series. The selected element represents sensor data input to a machine learning model and the ground truth represents the predicted result. In various embodiments, the training data is packaged and prepared as training data. In some embodiments, the training data is packaged into training, validation, and testing data. Based on the determined ground truth and selected element of the time series, the training data can be packaged to train a machine learning model to identify lane lines, the predicted path of a vehicle, speed limits, vehicle cut-ins, object distances, and/or drivable space, among other useful features for autonomous driving. The packaged training data is now available for training a machine learning model.

Figure 4:
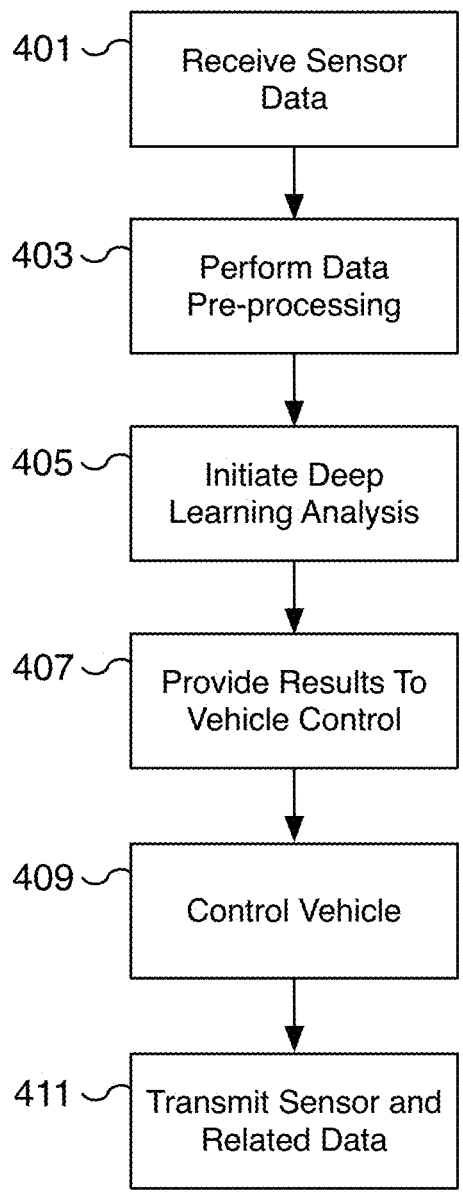
FIG. 4 is a flow diagram illustrating an embodiment of a process for training and applying a machine learning model for autonomous driving.

FIG. 4 is a flow diagram illustrating an embodiment of a process for training and applying a machine learning model for autonomous driving. In some embodiments, the process of FIG. 4 is utilized to collect and retain sensor and odometry data for training a machine learning model for autonomous driving. In some embodiments, the process of FIG. 4 is implemented on a vehicle enabled with autonomous driving whether the autonomous driving control is enabled or not. For example, sensor and odometry data can be collected in the moments immediately after autonomous driving is disengaged, while a vehicle is being driven by a human driver, and/or while the vehicle is being autonomously driven. In some embodiments, the techniques described by FIG. 4 are implemented using the deep learning system of FIG. 1. In some embodiments, portions of the process of FIG. 4 are performed at 207, 209, and/or 211 of FIG. 2 as part of the process of applying a machine learning model for autonomous driving.

At 401, sensor data is received. For example, a vehicle equipped with sensors captures sensor data and provides the sensor data to a neural network running on the vehicle. In some embodiments, the sensor data may be vision data, ultrasonic data, LiDAR data, or other appropriate sensor data. For example, an image is captured from a high dynamic range forward-facing camera. As another example, ultrasonic data is captured from a side-facing ultrasonic sensor. In some embodiments, a vehicle is affixed with multiple sensors for capturing data. For example, in some embodiments, eight surround cameras are affixed to a vehicle and provide 360 degrees of visibility around the vehicle with a range of up to 250 meters. In some embodiments, camera sensors include a wide forward camera, a narrow forward camera, a rear view camera, forward looking side cameras, and/or rearward looking side cameras. In some embodiments, ultrasonic and/or radar sensors are used to capture surrounding details. For example, twelve ultrasonic sensors may be affixed to the vehicle to detect both hard and soft objects. In some embodiments, a forward-facing radar is utilized to capture data of the surrounding environment. In various embodiments, radar sensors are able to capture surrounding detail despite heavy rain, fog, dust, and other vehicles. The various sensors are used to capture the environment surrounding the vehicle and the captured data is provided for deep learning analysis.

In some embodiments, the sensor data includes odometry data including the location, orientation, change in location, and/or change in orientation, etc. of the vehicle. For example, location data is captured and associated with other sensor data captured during the same time frame. As one example, the location data captured at the time that image data is captured is used to associate location information with the image data.

At 403, the sensor data is pre-processed. In some embodiments, one or more pre-processing passes may be performed on the sensor data. For example, the data may be pre-processed to remove noise, to correct for alignment issues and/or blurring, etc. In some embodiments, one or more different filtering passes are performed on the data. For example, a high-pass filter may be performed on the data and a low-pass filter may be performed on the data to separate out different components of the sensor data. In various embodiments, the pre-processing step performed at 403 is optional and/or may be incorporated into the neural network.

At 405, deep learning analysis of the sensor data is initiated. In some embodiments, the deep learning analysis is performed on the sensor data optionally pre-processed at 403. In various embodiments, the deep learning analysis is performed using a neural network such as a convolutional neural network (CNN). In various embodiments, the machine learning model is trained offline using the process of FIG. 2 and deployed onto the vehicle for performing inference on the sensor data. For example, the model may be trained to identify road lane lines, obstacles, pedestrians, moving vehicles, parked vehicles, drivable space, etc., as appropriate. In some embodiments, multiple trajectories for a lane line are identified. For example, several potential trajectories for a lane line are detected and each trajectory has a corresponding probability of occurring. In some embodiments, the lane line predicted is the lane line with the highest probability of occurring and/or the highest associated confidence value. In some embodiments, a predicted lane line from deep learning analysis requires exceeding a minimum confidence threshold value. In various embodiments, the neural network includes multiple layers including one or more intermediate layers. In various embodiments, the sensor data and/or the results of deep learning analysis are retained and transmitted at 411 for the automatic generation of training data.

In various embodiments, the deep learning analysis is used to predict additional features. The predicted features may be used to assist autonomous driving. For example, a detected vehicle can be assigned to a lane or road. As another example, a detected vehicle can be determined to be in a blind spot, to be a vehicle that should be yielded to, to be a vehicle in the left adjacent lane, to be a vehicle in the right adjacent lane, or to have another appropriate attribute. Similarly, the deep learning analysis can identify traffic lights, drivable space, pedestrians, obstacles, or other appropriate features for driving.

At 407, the results of deep learning analysis are provided to vehicle control. For example, the results are provided to a vehicle control module to control the vehicle for autonomous driving and/or to implement autonomous driving functionality. In some embodiments, the results of deep learning analysis at 405 are passed through one or more additional deep learning passes using one or more different machine learning models. For example, predicted paths for lane lines may be used to determine a vehicle lane and the determined vehicle lane is used to determine drivable space. The drivable space is then used to determine a path for the vehicle. Similarly, in some embodiments, a predicted vehicle cut-in is detected. The determined path for the vehicle accounts for predicted cut-ins to avoid potential collisions. In some embodiments, the various outputs of deep learning are used to construct a three-dimensional representation of the vehicle's environment for autonomous driving which includes predicted paths of vehicles, identified obstacles, identified traffic control signals including speed limits, etc. In some embodiments, the vehicle control module utilizes the determined results to control the vehicle along a determined path. In some embodiments, the vehicle control module is vehicle control module 109 of FIG. 1.

At 409, the vehicle is controlled. In some embodiments, a vehicle with autonomous driving activated is controlled using a vehicle control module such as vehicle control module 109 of FIG. 1. The vehicle control can modulate the speed and/or steering of the vehicle, for example, to maintain a vehicle in a lane at an appropriate speed in consideration of the environment around it. In some embodiments, the results are used to adjust the vehicle in anticipation that a neighboring vehicle will merge into the same lane. In various embodiments, using the results of deep learning analysis, a vehicle control module determines the appropriate manner to operate the vehicle, for example, along a determined path with the appropriate speed. In various embodiments, the result of vehicle controls such as a change in speed, application of braking, adjustment to steering, etc. are retained and used for the automatic generation of training data. In various embodiments, the vehicle control parameters are retained and transmitted at 411 for the automatic generation of training data.

At 411, sensor and related data are transmitted. For example, the sensor data received at 401 along with the results of deep learning analysis at 405 and/or vehicle control parameters used at 409 are transmitted to a computer server for the automatic generation of training data. In some embodiments, the data is a time series of data and the various gathered data are associated together by the computer server. For example, odometry data is associated with captured image data to generate a ground truth. In various embodiments, the collected data is transmitted wirelessly, for example, via a WiFi or cellular connection, from a vehicle to a training data center. In some embodiments, metadata is transmitted along with the sensor data. For example, metadata may include the time of day, a timestamp, the location, the type of vehicle, vehicle control and/or operating parameters such as speed, acceleration, braking, whether autonomous driving was enabled, steering angle, odometry data, etc. Additional metadata includes the time since the last previous sensor data was transmitted, the vehicle type, weather conditions, road conditions, etc. In some embodiments, the transmitted data is anonymized, for example, by removing unique identifiers of the vehicle. As another example, data from similar vehicle models is merged to prevent individual users and their use of their vehicles from being identified.

In some embodiments, the data is only transmitted in response to a trigger. For example, in some embodiments, an incorrect prediction triggers the transmitting of the sensor and related data for automatically collecting data to create a curated set of examples for improving the prediction of a deep learning network. For example, a prediction performed at 405 related to whether a vehicle is attempting to merge is determined to be incorrect by comparing the prediction to the actual outcome observed. The data, including sensor and related data, associated with the incorrect prediction is then transmitted and used to automatically generate training data. In some embodiments, the trigger may be used to identify particular scenarios such as sharp curves, forks in the roads, lane merges, sudden stops, or another appropriate scenario where additional training data is helpful and may be difficult to gather. For example, a trigger can be based on the sudden deactivation or disengagement of autonomous driving features. As another example, vehicle operating properties such as the change in speed or change in acceleration can form the basis of a trigger. In some embodiments, a prediction with an accuracy that is less than a certain threshold triggers transmitting the sensor and related data. For example, in certain scenarios, a prediction may not have a Boolean correct or incorrect result and is instead evaluated by determining an accuracy value of the prediction.

In various embodiments, the sensor and related data are captured over a period of time and the entire time series of data is transmitted together. The time period may be configured and/or be based on one or more factors such as the speed of the vehicle, the distance traveled, the change in speed, etc. In some embodiments, the sampling rate of the captured sensor and/or related data is configurable. For example, the sampling rate is increased at higher speeds, during sudden braking, during sudden acceleration, during hard steering, or another appropriate scenario when additional fidelity is needed.

Figure 5:
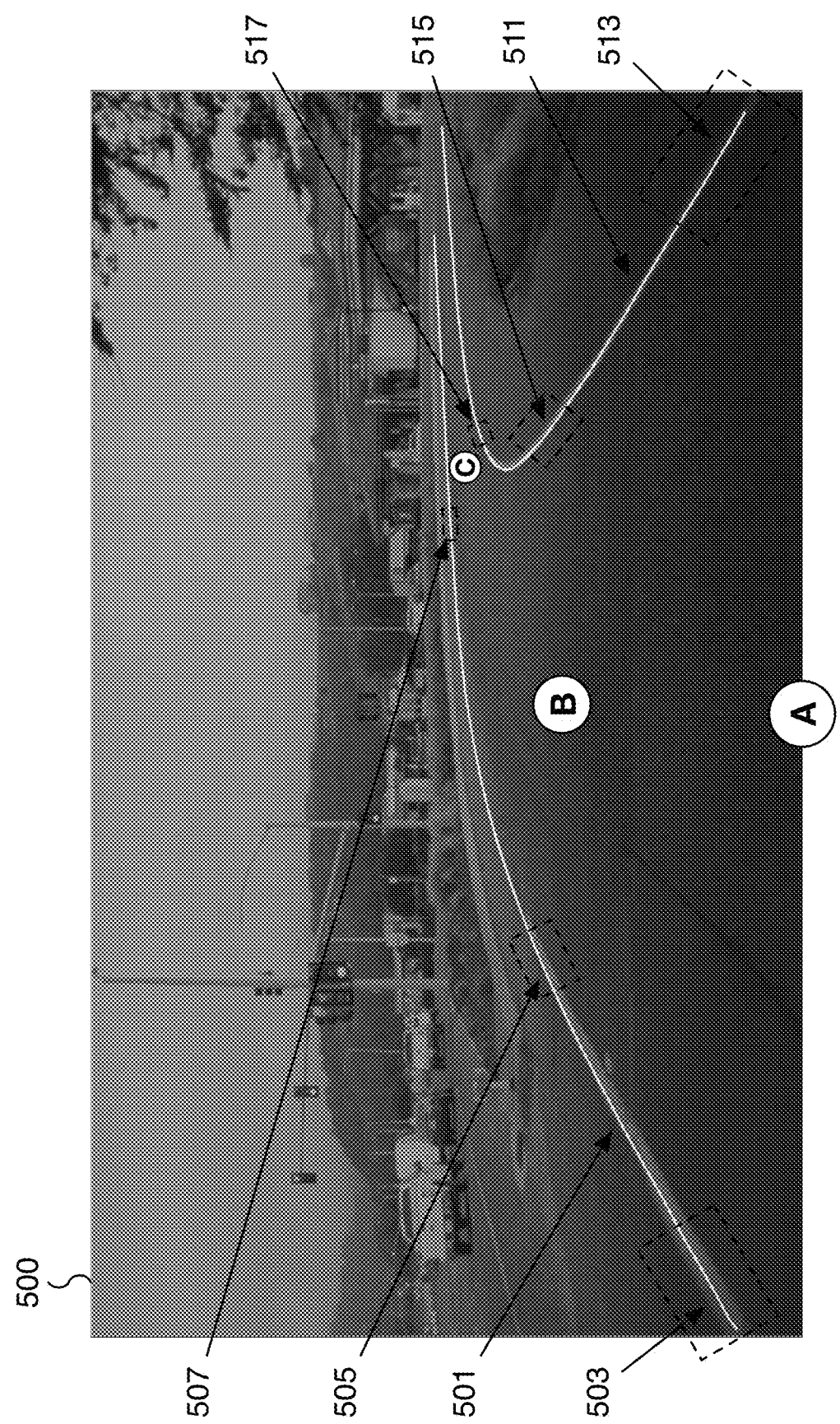
FIG. 5 is a diagram illustrating an example of an image captured from a vehicle sensor.

FIG. 5 is a diagram illustrating an example of an image captured from a vehicle sensor. In the example shown, the image of FIG. 5 includes image data 500 captured from a vehicle traveling in a lane between two lane lines. The location of the vehicle and sensor used to capture image data 500 is represented by label A. Image data 500 is sensor data and may be captured from a camera sensor such as a forward-facing camera of the vehicle while driving. Image data 500 captures portions of lane lines 501 and 511. Lane lines 501 and 511 curve to the right as lane lines 501 and 511 approach the horizon. In the example shown, lane lines 501 and 511 are visible but become increasingly difficult to detect as they curve away from the location of the camera sensor off into the distance. The white lines drawn on top of lane lines 501 and 511 approximate the detectable portions of lane lines 501 and 511 from image data 500 without any additional input. In some embodiments, the detected portions of lane lines 501 and 511 can be detected by segmenting image data 500.

In some embodiments, labels A, B, and C correspond to different locations on the road and to different times of a time series. Label A corresponds to the time and location of the vehicle at the time that image data 500 is captured. Label B corresponds to a location on the road ahead of the location of label A and at a time after the time of label A. Similarly, label C corresponds to a location on the road ahead of the location of label B and at a time after the time of label B. As the vehicle travels, it passes through the locations of labels A, B, and C (from label A to label C) and captures a time series of sensor and related data while traveling. The time series includes elements captured at the locations (and times) of labels A, B, and C. Label A corresponds to a first element of the time series, label B corresponds to an intermediate element of the time series, and label C corresponds to an intermediate (or potentially last) element of the time series. At each label, additional data is captured such as the odometry data of the vehicle at the label location. Depending on the length of the time series, additional or fewer data is captured. In some embodiments, a timestamp is associated with each element of the time series.

In some embodiments, a ground truth (not shown) for lane lines 501 and 511 is determined. For example, using the processes disclosed herein, locations of lane lines 501 and 511 are identified by identifying different portions of the lane lines 501 and 511 from different elements of a time series of elements. In the example shown, portions 503 and 513 are identified using image data 500 and related data (such as odometry data) taken at the location and time of label A. Portions 505 and 515 are identified using image data (not shown) and related data (such as odometry data) taken at the location and time of label B. Portions 507 and 517 are identified using image data (not shown) and related data (such as odometry data) taken at the location and time of label C. By analyzing a time series of elements, the location of different portions of lane lines 501 and 511 are identified and a ground truth can be determined by combining the different identified portions. In some embodiments, the portions are identified as points along each portion of a lane line. In the example shown, only three portions for each lane line are highlighted (portions 503, 505, and 507 for lane line 501 and portions 513, 515, and 517 for lane line 511) to explain the process but additional portions may be captured over a time series to determine the location of the lane line at a higher resolution and/or with greater accuracy.

In various embodiments, the locations of portions in image data capturing lane lines 501 and 511 that are closest to the location of the sensor are determined with a high degree of accuracy. For example, the locations of portions 503 and 513 are identified with a high degree of accuracy using image data 500 and related data (such as odometry data) of label A. The locations of portions 505 and 515 are identified with a high degree of accuracy using image and related data of label B. The locations of portions 507 and 517 are identified with a high degree of accuracy using image and related data of label C. By utilizing a time series of elements, the locations of various portions of lane lines 501 and 511 that are captured by the time series can be identified with a high degree of accuracy in three dimensions and used as a basis for the ground truth of lane lines 501 and 511. In various embodiments, the determined ground truth is associated with a selected element of the time series, such as image data 500. The ground truth and selected element may be used to create training data for predicting lane lines. In some embodiments, the training data is created automatically and without human labeling. The training data can be used to train a machine learning model to predict the three-dimensional trajectory of a lane line from captured image data, such as image data 500.

Figure 6:
FIG. 6 is a diagram illustrating an example of an image captured from a vehicle sensor with predicted three-dimensional trajectories of lane lines.

FIG. 6 is a diagram illustrating an example of an image captured from a vehicle sensor with predicted three-dimensional trajectories of lane lines. In the example shown, the image of FIG. 6 includes image data 600 captured from a vehicle traveling in a lane between two lane lines. The location of the vehicle and sensor used to capture image data 600 is represented by label A. In some embodiments, label A corresponds to the same location as label A of FIG. 5. Image data 600 is sensor data and may be captured from a camera sensor such as a forward-facing camera of the vehicle while driving. Image data 600 captures portions of lane lines 601 and 611. Lane lines 601 and 611 curve to the right as lane lines 601 and 611 approach the horizon. In the example shown, lane lines 601 and 611 are visible but become increasingly difficult to detect as they curve away from the location of the camera sensor and off into the distance. The red lines drawn on top of lane lines 601 and 611 are predicted three-dimensional trajectories of lane lines 601 and 611. Using the processes disclosed herein, the three-dimensional trajectories are predicted using image data 600 as an input to a trained machine learning model. In some embodiments, a predicted three-dimensional trajectory is represented as a three-dimensional parameterized spline or another parameterized form of representation.

In the example shown, portions 621 of lane lines 601 and 611 are parts of lane lines 601 and 611 that are off in the distance. The three-dimensional location (i.e., the longitude, latitude, and altitude) of portions 621 of lane lines 601 and 611 are determined with a high degree of accuracy using the processes disclosed herein and are included in the predicted three-dimensional trajectories of lane lines 601 and 611. Using a trained machine learning model, three-dimensional trajectories of lane lines 601 and 611 can be predicted using image data 600 and without requiring location data at the locations of portions 621 of lane lines 601 and 611. In the example shown, image data 600 is captured at the location and time of label A.

In some embodiments, label A of FIG. 6 corresponds to label A of FIG. 5 and the predicted three-dimensional trajectories of lane lines 601 and 611 are determined using only image data 600 as input to a trained machine learning model. By training the machine learning model using a ground truth determined using image and related data of a time series that includes elements taken at the locations of labels A, B, and C of FIG. 5, three-dimensional trajectories of lane lines 601 and 611 are predicted with a high degree of accuracy even portions of the lane lines in the distance, such as portions 621. Although image data 600 and image data 500 of FIG. 5 are related, the prediction of trajectories does not require image data 600 to be included in the training data. By training on sufficient training data, lane lines can be predicted even for newly encountered scenarios. In various embodiments, the predicted three-dimensional trajectories of lane lines 601 and 611 are used to maintain the position of the vehicle within the detected lane lines and/or to autonomously navigate the vehicle along the detected lane of the prediction lane lines. By predicting the lane lines in three-dimensions, the performance, safely, and accuracy of the navigation is vastly improved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive image data based on an image captured by a camera of a vehicle;
determine a three-dimensional trajectory of a machine learning feature based on input of the image data to a machine learning model,
wherein the machine model was trained based on training data comprising:
a ground truth associated with a plurality of time series elements, the ground truth comprising a particular three-dimensional trajectory associated with a particular machine learning feature generated based on the time series elements, the timeseries elements comprising respective images captured at respective times within a period of time, wherein the ground truth is generated based on particular portions of individual time series elements, and
a selected time series element of the plurality of time series elements,
wherein the machine model was trained to output the ground truth associated with the plurality of time series elements based on an input of the selected time series element; and
provide the three-dimensional trajectory of the machine learning feature in automatically controlling the vehicle; and
a memory coupled to the processor and configured to provide the processor with instructions.

2. The system of claim 1, wherein the machine learning feature is associated with a vehicle lane line.

3. The system of claim 2, wherein portions of the three-dimensional trajectory of the vehicle lane line are occluded in the image data.

4. The system of claim 2, wherein the processor is further configured to use the vehicle lane line to identify a vehicle lane occupied by the vehicle.

5. The system of claim 4, wherein the vehicle lane is used to identify a drivable space.

6. The system of claim 5, wherein the identified drivable space is used to maintain the vehicle in the vehicle lane.

7. The system of claim 1, wherein the camera of the vehicle includes at least one of the following: a front-facing camera, a side-facing camera, or a rear-facing camera.

8. The system of claim 1, wherein the predicted three-dimensional trajectory is one of a plurality of identified potential trajectories.

9. The system of claim 8, wherein the predicted three-dimensional trajectory has a probability of occurring value that is the highest of the plurality of identified potential trajectories.

10. The system of claim 1, wherein the training data further includes a related set of odometry data associated with the time series elements.

11. The system of claim 10, wherein at least a portion of the training data is automatically labeled as the ground truth.

12. The system of claim 1, wherein the controlling of the vehicle includes adjusting a speed and a steering of the vehicle.

13. The system of claim 1, wherein the three-dimensional trajectory is represented by a spline.

14. The system of claim 1, wherein the three-dimensional trajectory is represented by one or more piecewise polynomials.

15. The system of claim 1, wherein the machine learning feature is associated with a predicated path of a second vehicle.

16. The system of claim 15, wherein the predicated path of the second vehicle is used to determine whether the second vehicle is likely to enter a lane occupied by the vehicle being automatically controlled.

17. The system of claim 16, wherein the controlling of the vehicle includes adjusting a speed or steering to avoid a collision with the second vehicle.

18. A computer program product, the computer program product being embodied in a non-transitory computer readable storage medium and comprising computer instructions for:
   receiving image data based on an image captured by a camera of a vehicle;
   determining a three-dimensional trajectory of a vehicle lane line based on input of the image data to a machine learning model,
   wherein the machine model was trained based on training data comprising:
      a ground truth associated with a plurality of time series elements comprising respective images, the ground truth comprising a particular three-dimensional trajectory associated with a particular lane line represented in the images, and
      a selected time series element of the plurality of time series elements,
   wherein the machine model was trained to output the ground truth associated with the plurality of time series elements based on an input of the selected time series element; and
   providing the three-dimensional trajectory of the vehicle lane in automatically controlling the vehicle.

19. A method, comprising:
   receiving image data based on an image captured by a camera of a vehicle;
   determining a three-dimensional trajectory of a vehicle lane line based on input of the image data to a machine learning model,
   wherein the machine model was trained based on training data comprising:
      a ground truth associated with a plurality of time series elements comprising respective images, the ground truth comprising a particular three-dimensional trajectory associated with a particular lane line represented in the images, and
      a selected time series element of the plurality of time series elements,
   wherein the machine model was trained to output the ground truth associated with the plurality of time series elements based on an input of the selected time series element; and
   providing the three-dimensional trajectory of the vehicle lane in automatically controlling the vehicle.

* * * * *